(12) United States Patent
Francini et al.

(10) Patent No.: US 11,105,263 B2
(45) Date of Patent: Aug. 31, 2021

(54) CONSTANT FLOW FUNCTION AIR EXPANSION TRAIN WITH COMBUSTER

(71) Applicant: NUOVO PIGNONE TECNOLOGIE SRL, Florence (IT)

(72) Inventors: Stefano Francini, Florence (IT); Sebastian Walter Freund, Garching (DE); Vittorio Michelassi, Florence (IT)

(73) Assignee: Nuovo Pignone SRL, Florence (IT)

( * ) Notice: Subject to any disclaimer, the term of this patent is extended or adjusted under 35 U.S.C. 154(b) by 224 days.

(21) Appl. No.: 15/756,738

(22) PCT Filed: Sep. 5, 2016

(86) PCT No.: PCT/EP2016/070843
§ 371 (c)(1),
(2) Date: Mar. 1, 2018

(87) PCT Pub. No.: WO2017/042122
PCT Pub. Date: Mar. 16, 2017

(65) Prior Publication Data
US 2018/0258850 A1 Sep. 13, 2018

(30) Foreign Application Priority Data
Sep. 7, 2015 (IT) .......................... 102015000049057

(51) Int. Cl.
*F02C 6/16* (2006.01)
*F02C 9/18* (2006.01)
(Continued)

(52) U.S. Cl.
CPC .................. *F02C 6/16* (2013.01); *F02C 6/06* (2013.01); *F02C 7/143* (2013.01); *F02C 9/18* (2013.01);
(Continued)

(58) Field of Classification Search
CPC ....... F02C 6/06; F02C 6/14; F02C 6/16; F02C 7/14; F02C 7/143; F02C 9/18; F02C 7/08;
(Continued)

(56) References Cited

U.S. PATENT DOCUMENTS 3,831,373 A * 8/1974 Flynt .......................... F02C 6/16
60/802
4,150,547 A * 4/1979 Hobson ..................... F02C 6/16
165/45

(Continued)

OTHER PUBLICATIONS

Benson, Tom. "Compressible Mass Flow Rate", NASA Glenn Research Center. Obtained from Wayback Machine Internet Archive at: <https://web.archive.org/web/20130723171035/https://www.grc.nasa.gov/www/k-12/VirtualAero/BottleRocket/airplane/mflchk.html> on Jan. 10, 2020 (Year: 2013).*

(Continued)

*Primary Examiner* — Alain Chau
(74) *Attorney, Agent, or Firm* — Baker Hughes Patent Organization

(57) ABSTRACT

A compressed air energy storage system is described, including a compressor fluidly coupled to a compressed air reservoir and an expansion train including at least a first turbine. The system further includes an electric machine aggregate configured: for converting electric power into mechanical power and driving the compressor therewith during the energy storing mode; and for converting mechanical power produced by the expansion train into electric power during the power production mode. A combustor is configured for receiving fuel and compressed air and producing combustion gas, and for supplying the combustion gas to the first turbine.

18 Claims, 6 Drawing Sheets

(51) Int. Cl.
*F02C 6/06* (2006.01)
*F02C 7/143* (2006.01)

(52) U.S. Cl.
CPC ......... *F05D 2270/053* (2013.01); *Y02E 60/14* (2013.01); *Y02E 60/16* (2013.01)

(58) Field of Classification Search
CPC ......... Y02E 60/14; Y02E 60/15; Y02E 20/14; Y02E 20/16; Y02E 70/30; F01D 3/02
See application file for complete search history.

(56) References Cited

U.S. PATENT DOCUMENTS

| | | | | |
|---|---|---|---|---|
| 4,312,179 | A * | 1/1982 | Zaugg | F02C 6/16 60/774 |
| 4,523,432 | A * | 6/1985 | Frutschi | E21B 43/00 60/646 |
| 4,686,822 | A * | 8/1987 | Frutschi | F02C 6/16 60/727 |
| 4,942,736 | A * | 7/1990 | Bronicki | F02C 6/16 60/641.12 |
| 5,448,889 | A * | 9/1995 | Bronicki | F02C 1/05 60/641.14 |
| 5,778,675 | A * | 7/1998 | Nakhamkin | F02C 7/143 60/652 |
| 6,276,123 | B1 * | 8/2001 | Chen | F02C 1/06 60/39.183 |
| 7,174,777 | B2 * | 2/2007 | Fischer | F02B 37/013 73/114.33 |
| 8,197,182 | B2 * | 6/2012 | Hernandez | F01D 3/02 415/93 |
| 8,689,566 | B1 | 4/2014 | Coney | |
| 8,984,893 | B2 * | 3/2015 | Schroder | F02C 6/16 60/772 |
| 9,003,763 | B2 * | 4/2015 | Coney | F01K 23/10 60/39.182 |
| 9,938,895 | B2 * | 4/2018 | Kerth | F02C 6/16 |
| 10,450,953 | B2 * | 10/2019 | Pedretti-Rodi | F28D 20/00 |
| 2003/0033807 | A1 * | 2/2003 | Bakran | F02C 6/16 60/676 |
| 2003/0033812 | A1 | 2/2003 | Gerdes et al. | |
| 2003/0037547 | A1 | 2/2003 | Bakran et al. | |
| 2005/0097945 | A1 * | 5/2005 | Flores | F02B 37/013 73/114.33 |
| 2010/0158666 | A1 * | 6/2010 | Hernandez | F01D 3/02 415/93 |
| 2011/0094231 | A1 * | 4/2011 | Freund | F02C 6/16 60/727 |
| 2011/0094236 | A1 * | 4/2011 | Finkenrath | H02J 15/006 60/772 |
| 2011/0100010 | A1 * | 5/2011 | Freund | F02C 6/16 60/659 |
| 2011/0100583 | A1 * | 5/2011 | Freund | F28D 17/02 165/10 |
| 2011/0127004 | A1 * | 6/2011 | Freund | F02C 6/16 165/45 |
| 2014/0096523 | A1 * | 4/2014 | Coney | F01K 23/10 60/650 |
| 2014/0137563 | A1 * | 5/2014 | Kerth | F02C 6/16 60/772 |
| 2014/0305127 | A1 * | 10/2014 | Schroder | F02C 6/16 60/772 |
| 2015/0096289 | A1 * | 4/2015 | Pedretti-Rodi | F02C 6/16 60/327 |

OTHER PUBLICATIONS

Berti, M., et al., Compressed-air energy-storage system, GE Co-pending Application No. FI2012A000075, filed on Apr. 12, 2012.
Italian Search Report and Written Opinion issued in connection with corresponding IT Application No. IT102015000049057 dated May 26, 2016.
International Search Report and Written Opinion issued in connection with corresponding PCT Application No. PCT/EP2016/070843 dated Dec. 7, 2016.
International Preliminary Report on Patentability issued in connection with corresponding PCT Application No. PCT/EP2016/070843 dated Mar. 13, 2018.

* cited by examiner

CONSTANT FLOW FUNCTION AIR EXPANSION TRAIN WITH COMBUSTER

BACKGROUND OF THE INVENTION

The present disclosure relates to compressed air energy storage systems, also shortly called CAES systems. The disclosure also refers to methods for energy storage and electric energy production using CAES systems.

CAES power plants or systems are commonly used as a means for optimizing the exploitation of energy. As known, the electric power required from the electric energy distribution grid varies with peaks of electric power requests during the day and reduced electric power request at nighttime. Large steam power plants produce an amount of power, which cannot be varied at will. This causes an excess of power available on the electric energy distribution grid at nighttime and a power shortage during peak hours. Small power plants using gas turbines, especially aeroderivative gas turbines, have been implemented in order to cover the peak power requests. These plants can be turned on and shut down according to the variable power requirements during the 24 hours. This notwithstanding, further measures must be met, in order to store the energy in excess produced at nighttime and recover the stored energy to increase the electric power production during peak hours.

One of the means used for that purpose is the CAES technology. CAES systems typically include a compression train having one or more compressors, which are driven by electric power from the electric energy distribution grid during nighttime, i.e. when less power is required than available on the grid. The compressor train compresses ambient air, which is stored under pressure in a large reservoir, such as e.g. a cavern. Excess power available from the grid is thus transformed into pressure energy of stored compressed air.

Compressed air is then exploited during the day to cover peak power requests from the grid. Electric power is obtained by expanding the compressed air to a suitable pressure and burning an air/fuel mixture in a combustion chamber to generate combustion gases, which are expanded in a turbine for mechanical power generation. An electric generator converts the mechanical power into electric power.

In order to reduce the environmental impact of CAES systems, so-called adiabatic or advanced adiabatic compressed air energy storage systems (also known as ACAES or AACAES) have been developed. ACAES or AACAES systems do not make use of fossil fuel to convert the accumulated energy into electric power. Rather, they store heat generated by the process of air compression and recover said heat to increase the air temperature before expanding the compressed air through one or more expanders.

Efficiency of CAES systems is adversely affected by the air pressure drop, which is due to gradual consumption of compressed air and emptying of the compressed air reservoir. Pressure variation during operation modifies the flow function of the turbine or expander, which controls the efficiency of the turbine or expander and the power delivered thereby.

Therefore, there is a need for providing an improved CAES system, wherein operation of the turbine or expander can be made more efficient whereby higher power rates are made available.

SUMMARY OF THE INVENTION

According to one aspect, a compressed air energy storage system (here below shortly indicated as CAES system) is provided, comprising a compressor fluidly coupled to a compressed air reservoir and configured for delivering compressed air therein during an energy storing mode of the system. The CAES system further comprises an expansion train for expanding compressed air or combustion gas and produce mechanical power therewith during a power production mode of the system. The expansion train comprises at least a first turbine or expander. An electric machine aggregate is further provided, which is configured for converting electric power into mechanical power and driving the compressor therewith during the energy storing mode; and for converting mechanical power produced by the expansion train into electric power during the power production mode. A combustor is arranged for receiving fuel and compressed air, either directly from the compressed air reservoir, or indirectly through an upstream expanding device, such as an expansion valve or a further turbine or expander. The combustor produces combustion gas by burning an air/fuel mixture and supplies the combustion gas to the first turbine for expansion therein. A by-pass line is arranged in parallel to the combustor, for supplying compressed air to the first turbine, by-passing the combustor, such that the flow rate of combustion gas and the flow rate of air delivered to the first turbine can be adjusted depending upon operating conditions of the CAES system.

An air flow control system can further be provided, configured for adjusting the air flow rate through the by-pass line and through the combustor, respectively. According to some embodiments, the air flow adjustment system comprises a valve along the by-pass line and a valve upstream of the combustor.

For additional adjustment capability, in some embodiments the first turbine can comprise variable nozzle guide vanes.

In some embodiments, an inlet pressure adjusting valve can be provided upstream of the first turbine of the expansion train. In order to provide increased efficiency, in addition or as an alternative to the inlet pressure adjusting valve, the expansion train can further comprise a second turbine or expander, which is fluidly connected to the first turbine and arranged in series therewith, e.g. between the compressed air reservoir and the first turbine, i.e. upstream of the latter with respect to the air flow direction. The by-pass line and the combustor are arranged between the second turbine and the first turbine. Also the second turbine can comprise variable nozzle guide vanes.

The CAES system can further comprise one or more thermal energy storage systems, configured for removing heat from compressed air delivered by the compressor to the compressed air reservoir, and for delivering heat to compressed air flowing from the compressed air reservoir towards the expansion train.

The air flow control system can be configured for offsetting a variation of a flow function of the first turbine as air pressure in the compressed air reservoir or a turbine power requirement changes.

The air flow control system can be configured for modifying at least one of the combustor exit temperature and the air flow through the by-pass line, to control a temperature at the inlet of the first turbine during operation of the system in the power production mode.

According to a further aspect, disclosed herein is a mode of operating a compressed air energy storage (CAES) system as defined above, comprising the steps of:

delivering compressed air to the first turbine through the by-pass line, expanding said compressed air in the first turbine and producing mechanical power therewith;

increasing an energy content at the inlet of the first turbine by delivering compressed air and fuel to the combustor, producing combustion gas therewith, and delivering the combustion gas in combination with the compressed air to the first turbine.

The amount of combustion gas can be controlled such as to limit variations of a flow function at the inlet of the first turbine while air pressure in the compressed air reservoir or a turbine power requirement change.

If a first turbine and a second turbine are provided in the expansion train, the method can further comprise the step of adjusting an intermediate pressure between the first turbine and the second turbine. The pressure adjustment can be controlled by acting upon variable nozzle guide vanes of the first and/or of the second turbine, and/or by means of respective inlet valves upstream of the first turbine and/or of the second turbine.

The method can further comprise one or more of the following steps or functions: varying the combustor exit temperature to control the turbine inlet temperature; varying the combustor bypass, i.e. the amount of air by-passing the combustor vs. the air entering the combustor, to control the turbine inlet temperature; acting upon a turbine inlet valve to control the inlet pressure at the inlet of the first turbine or of the second turbine, if provided; acting upon the variable nozzle guide vanes of the first turbine to control the turbine inlet pressure; raising or lowering both the turbine inlet pressure and the turbine inlet temperature of the first turbine in parallel; adjusting the operating conditions of the CAES system, e.g. by varying the amount of fuel and/or the flow rate through the combustor with the aim of meeting a certain expansion train power requirement, while trading combustor fuel input against mass flow.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
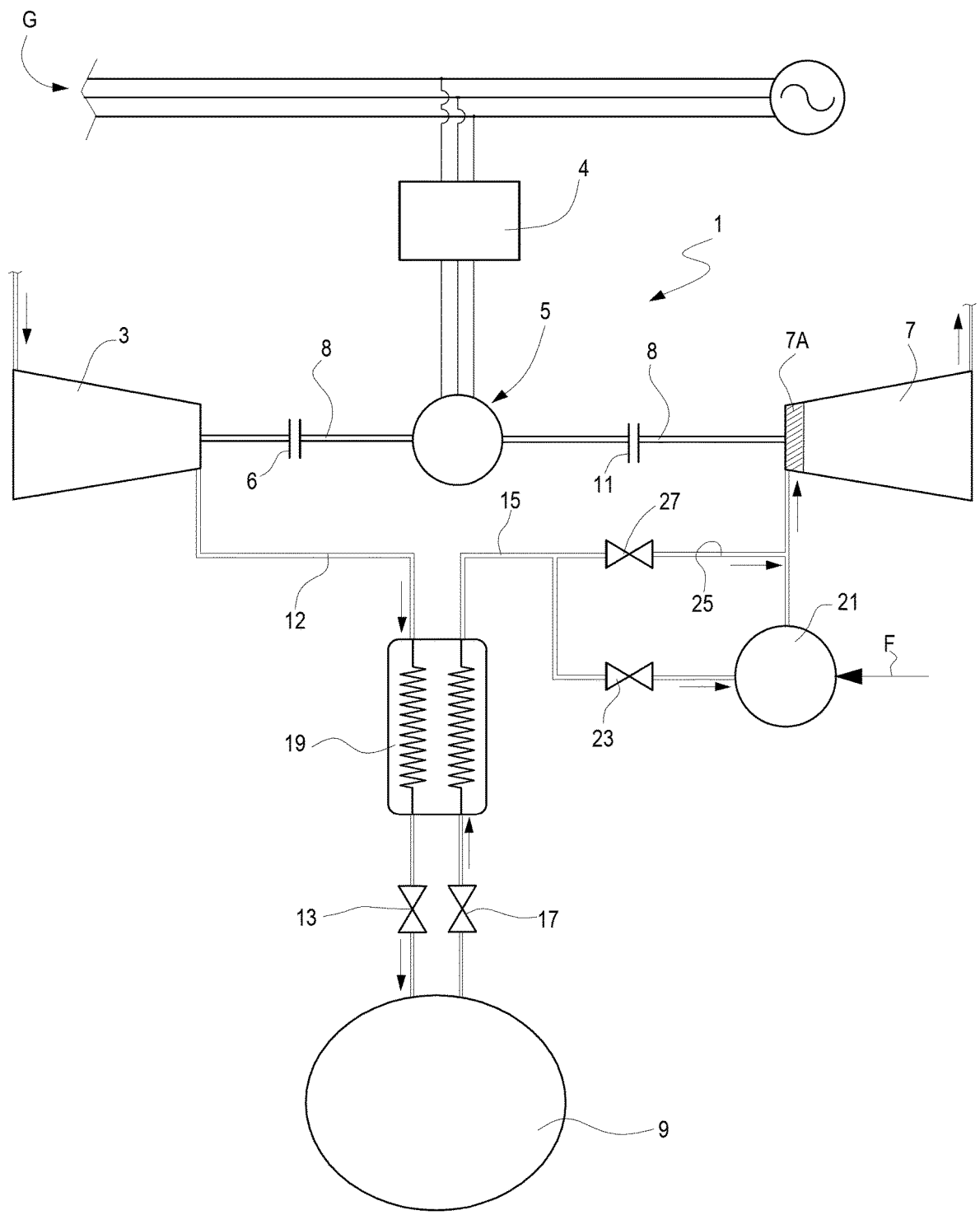
FIG. 1 illustrates a schematic of a CAES system according to an embodiment.

FIG. 1 illustrates an embodiment of a compressed air energy storage system (here below shortly CAES system) according to the present disclosure. The CAES system 1, comprises: compressor train, which can comprise a compressor 3; an electric machine aggregate 5; and an expansion train, which can include a turbine 7.

The compressor 3 can be a single compressor or a compressor train. As used herein, and in the appended claims, the term "compressor" shall be thus understood as any combination of one or more machines suitable for compressing air from a first pressure to a second pressure. The compressor 3 can be a centrifugal compressor, an axial compressor or can include a combination of compressors, e.g. both axial and centrifugal compressors.

In the embodiment schematically illustrated in FIG. 1, the electric machine aggregate 5 comprises a reversible electric machine, i.e. a machine which can alternatively operate in an electric motor mode and in an electric generator mode.

In the embodiment of FIG. 1, the turbine 7 is a single turbine, e.g. a radial turbine or an axial turbine. The turbine 7 can be a single-stage or multi-stage turbine. In other embodiments, a plurality of serially arranged turbines can be used.

The turbine 7 can be provided with variable nozzle guide vanes (NGVs), schematically shown at 7A.

In FIG. 1 the compressor 3, the electric machine aggregate 5 and the turbine 7 are arranged on a same shaft line 8. A first clutch 6 is arranged between the compressor 3 and the electric machine aggregate 5, and a second clutch 11 is arranged between the electric machine aggregate 5 and the turbine 7. With this arrangement, the electric machine aggregate 5 can be mechanically coupled to the compressor 3, or to the turbine 7, alternatively. The electric machine aggregate 5 can be connected to an electric energy distribution grid G directly as a synchronous machine, or by means of a variable frequency drive 4, or any other type of adjustable-speed drive used to control the speed and torque of the electric machine aggregate 5 by varying input frequency, phase, current and voltage.

In other embodiments, not shown, rather than a single reversible electric machine, the electric machine aggregate 5 can include an electric motor connected to the compressor and an electric generator connected to the turbine. Both the electric motor and the electric generator are connected to the electric energy distribution grid G. In this case no clutches would be required.

The CAES system 1 further comprises a compressed air reservoir 9. The delivery side of the compressor 3 is fluidly coupled to the compressed air reservoir 9 through an inlet line 12, along which a compressor valve 13 is arranged. The inlet of the turbine 7 is fluidly coupled to the compressed air reservoir 9 through an outlet line 15, along which a turbine valve 17 is provided.

In the embodiment of FIG. 1, a thermal energy storage system 19 can be provided. The inlet line 12 and the outlet line 15 extend through the thermal energy storage system 19, such that heat can be removed from the compressed air flowing through the inlet line 12 and accumulated in the thermal energy storage system 19, e.g. in the form of liquefying latent heat of a suitable heat storage medium. The stored heat can be removed from the thermal energy storage system 19 by air flowing through the outlet line 15, to heat the compressed air prior to delivering to the turbine 7.

The CAES system 1 further comprises a combustor or combustion chamber 21 with a fuel delivery line F. The inlet of the combustor 21 is connected to the outlet line 15 through a combustor valve 23. The outlet of the combustor 21 is fluidly coupled to the inlet of the turbine 7. A by-pass line 25 is arranged in parallel to the combustor 21. A by-pass valve 27 is arranged on the by-pass line 25.

The CAES system 1 of FIG. 1 operates as follows. As mentioned, the CAES system 1 stores energy generated during periods of low energy demand (off-peak), e.g. at nighttime, and releases energy during periods of high energy demand (peak loads), e.g. during day-time.

When the power demand from the electric energy distribution grid G is lower than the available power, the CAES system 1 is operated in an energy storing mode. The reversible electric machine of the electric machine aggregate 5 is switched in the electric motor mode and drives the compressor 3 exploiting electric power from the electric energy distribution grid G. The first clutch 6 is engaged, such that mechanical power generated by the reversible electric machine of the electric machine aggregate 5 can be used to rotate the compressor 3. The second clutch 11 is disengaged and the turbine 7 is inoperative. The compressor valve 13 is open and the turbine valve 17 is closed. The combustor 21 is turned off.

Ambient air is ingested by the compressor 3 and delivered into the compressed air reservoir 9 through the thermal energy storage system 19. Since the air temperature increases during the compression step, heat can be removed therefrom while flowing through the thermal energy storage system 19, and stored for use when the CAES system 1 operates in the power generation mode, as will be described herein below.

In some embodiments, not shown, one or more intercooling stages can be provided between sequentially arranged stages of the compressor 3, or between sequentially arranged compressors, if needed. An air cooler, not shown, can also be provided between the thermal energy storage system 19 and the compressed air reservoir 9.

Operation of the CAES system 1 in the energy storing mode continues until the maximum air pressure in the compressed air reservoir 9 has been reached, or until excess energy is available from the electric energy distribution grid G.

When the power demand from the electric energy distribution grid G increases, the CAES system 1 can be switched in a power production mode. The first clutch 6 is disengaged and the second clutch 11 is engaged. The compressor valve 13 is closed and the turbine valve 17 is open. The reversible electric machine of the electric machine aggregate 5 is switched in the generator mode. Compressed air can flow from the compressed air reservoir 9 through the thermal energy storage system 19, where heat stored during the energy storing mode can be transferred by heat exchange to the compressed air flowing through the outlet line 15. The compressed air can thus be heated prior to flowing in the turbine 7.

Compressed air can be delivered to the turbine 7 through two paths, namely: directly through the by-pass line 25, when the by-pass valve 27 is party or entirely open and the combustor valve 23 is closed. The air will expand in turbine 7 from the pressure in the outlet line 15 to the ambient pressure. The enthalpy drop generates mechanical power available on the shaft 8; through the combustor 21, when the combustor valve 23 is at least partly open. In the combustor 21, compressed air is mixed with fuel F and the air/fuel mixture is ignited to generate combustion gas, which flows and expands through the turbine 7. The by-pass valve 27 can be entirely closed, such that the entire air flow passes through the combustor 21. It is not excluded, however, that the by-pass valve 27 be at least partly open also in this mode of operation. Air will then flow partly through the combustor 21 and partly through the by-pass line 25.

Thus, depending upon the operating conditions of the CAES system 1, air can flow only through the by-pass line 25, only through the combustor 21, or partly through the by-pass line 25 and partly through the combustor 21.

During the power production mode the pressure in the compressed air reservoir 9 gradually drops. Therefore, the pressure at the inlet of the turbine 7 slowly decays and can only be lowered by a valve upstream thereof, but not raised. In case another turbine or expander is arranged upstream in the expansion train before the combustor, such as a radial expander with variable NGVs, the pressure can be lowered or raised to a certain extent. Moreover, the temperature of the air entering the turbine 7 or the combustor 21 can be constant if the air comes directly from the compressed air reservoir 9, or will depend on the pressure ratio of an upstream turbine (if present) and on the presence of the thermal energy storage system 19 that preheats the air before expansion, as shown in the exemplary embodiment of FIG. 1. The air temperature can drop, just as the air pressure, over time, due to the gradual exploitation of the thermal energy accumulated in the thermal energy storage system 19.

The efficiency and power delivery by the turbine 7 are controlled by a flow function, which provides a link between the mass flow rate through the turbine, the temperature at the turbine inlet and the pressure at the turbine inlet. The flow function (FF) can be defined as follows:

$$FF = \frac{m\sqrt{T}}{P}$$

wherein:
m is the mass flow through the turbine 7
P is the inlet pressure of the turbine 7
T is the inlet temperature of the turbine 7.

If the air flow were caused to flow only through the by-pass line 25, due to decreasing temperature T and decreasing pressure P at the inlet of the turbine 7 over time, in order to maintain a given power output from the turbine 7, it would be necessary to increase the mass flow, i.e. the amount of air per time unit, acting upon the variable NGVs 7A of the turbine 7. The increased air flow rate would cause the turbine 7 to operate in an off-design condition with reduced efficiency.

In order to balance the effect of temperature and pressure decay over time, according to some modes of operation of the CAES system 1, part of the air flow is diverted through the combustor 21, by at least partly opening the combustor valve 23 and at least partly closing the by-pass valve 27, if needed. In this way, a mixture of air from the by-pass line 25 and combustion gas from the combustor 21 is delivered at the inlet of the turbine 7. The inlet temperature of the compressed working gas (air and combustion gas) is thus increased to raise the energy content thereof. The excursion of the flow function FF is reduced and the off-design operating condition of the turbine 7 is alleviated, thus reducing the need of large variations of the NGVs 7A.

The air flow rate through the by-pass line 25 and through the combustor 21 can be modified over time, from a starting condition, with a maximum pressure in the compressed air reservoir 9 and maximum temperature in the thermal energy storage system 19, to a condition of minimum air pressure and temperature in the outlet line 15. When operation of the CAES system 1 in the power production mode starts, the entire air flow can be delivered to the turbine 7 through the by-pass valve 27 and by pass line 25, thus saving fuel and reducing the environmental impact. An increasing amount of air can be diverted through the combustor 21 as pressure and temperature in the outlet line 15 gradually drop.

Figure 2:
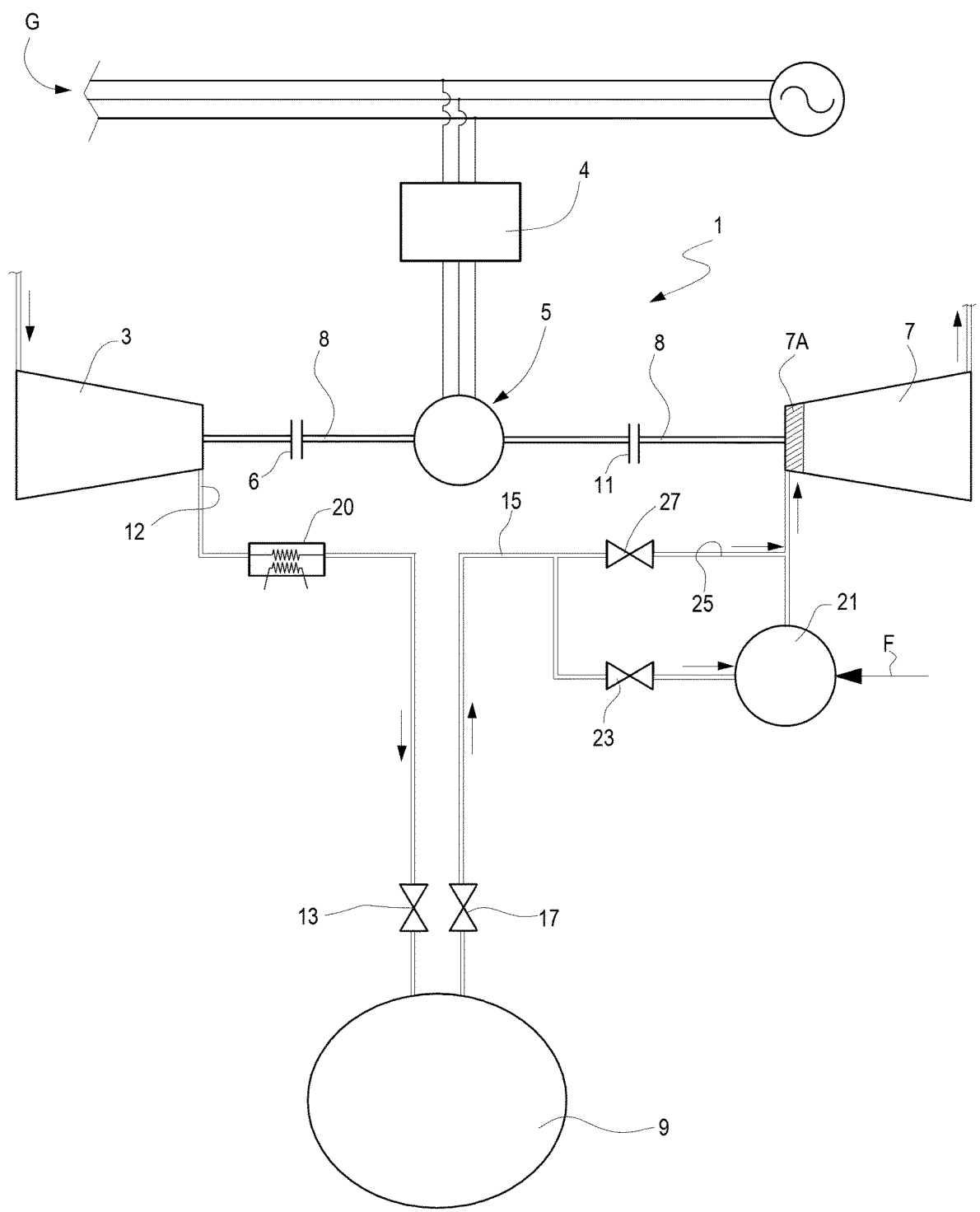
FIG. 2 illustrates a schematic of a CAES system according to an embodiment.

FIG. 2 schematically illustrates a further embodiment of a CAES system 1 according to the present disclosure. The same reference numbers designate the same or corresponding parts as in FIG. 1. The CAES system 1 of FIG. 2 differs from the CAES system 1 of FIG. 1 because no thermal energy storage system 19 is provided. Instead of a thermal energy storage system, a cooler 20 is foreseen, between the compressor 3 and the compressed air reservoir 9. In this embodiment, no thermal energy is stored and thus the air temperature at the inlet of the turbine 7 during the power production mode is lower.

The operation of the CAES system 1 of FIG. 2 is substantially the same as that of the system of FIG. 1 except that the combustor 21 will be more extensively used. In some embodiments, the combustor 21 can be used over the entire operation of the CAES system 1, with a gradually increasing air flow rate through the combustor 21 and thus a gradually increasing amount of fuel used as the pressure at the turbine inlet decreases.

Figure 3:
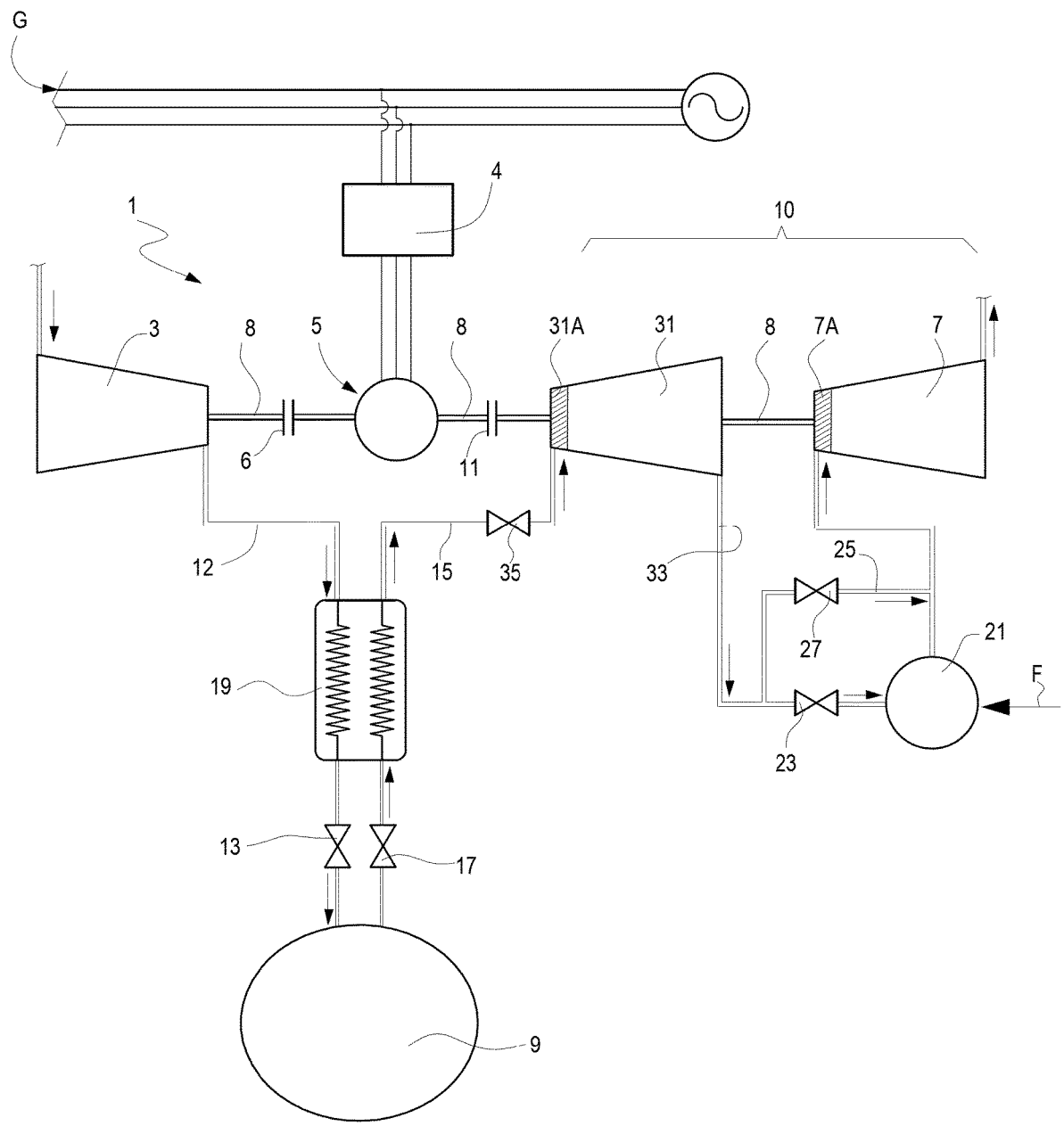
FIG. 3 illustrates a schematic of a CAES system according to an embodiment.

A further embodiment of a CAES system 1 according to the present disclosure is schematically illustrated in FIG. 3. The same reference numbers as in FIGS. 1 and 2 designate the same or equivalent parts, components or elements, which will not be described again. The CAES system 1 of FIG. 3 differs from the CAES system 1 of FIG. 1 in respect of the expansion train arrangement. In the embodiment of FIG. 3 the expansion train, globally labeled 10, comprises a first turbine 7 and a second turbine 31, arranged upstream of the first turbine 7 with respect to the direction of flow of the working gas flowing through the turbines, i.e. between the compressed air reservoir 9 and the combustor 21. The second turbine 31 can be provided with variable nozzle guide vanes NGVs, schematically shown at 31A.

The second turbine 31 is arranged between the thermal energy storage system 19 and the arrangement comprising the by-pass line 25 and the combustor 21. The inlet of the second turbine 31 thus receives compressed and heated air from the thermal energy storage system 19 and delivers partly expanded air in a line 33, fluidly coupled to the by-pass line 25 and the combustor 21.

The CAES system 1 of FIG. 3 thus comprises a high-pressure expander 31 and a low-pressure expander 7. For any given pressure values at the inlet and at the outlet of the expansion train 10, an intermediate pressure between the second turbine 31 and the first turbine 7 can be adjusted within a certain range around a design value by controlling the NGVs of both turbines 7, 31 and/or by a turbine control valve 35 upstream of the second turbine 31.

In other embodiments, not shown, the second turbine 31 can be omitted, and a throttling valve, such as valve 35, can be used to adjust the inlet pressure of the first turbine 7. However, in this case part of the energy available from the compressed air will be dissipated in the throttling valve, while in the system of FIG. 3 the intermediate pressure adjustment can be performed substantially without energy loss, since the pressure drop across the second, high-pressure turbine 31, is at least partly converted into useful mechanical power.

Both the first turbine 7 and the second turbine 31 can be arranged on the same shaft 8. In other embodiments, a different shaft arrangement can be provided. For instance, a gearbox can be arranged between the first turbine 7 and the second turbine 31, such that the first turbine 7 and the second turbine 31 can rotate at different speeds.

Compared to the configuration of FIG. 1, the CAES system 1 of FIG. 3 provides an additional degree of freedom for influencing the flow function FF of the turbine. Said additional degree of freedom is represented by the intermediate pressure between the first turbine 7 and the second turbine 31. This allows a significant wider range of power outlet from the first, low-pressure turbine 7 without large diversions from the design flow function thereof and thus with good turbine efficiency. For more power from the first turbine 7, the inlet pressure of the first turbine 7 can be raised to partially offset the increase in temperature and mass flow rate which would otherwise raise the flow function.

When the turbine pressure ratio is increased together with the inlet temperature, both system power output and efficiency will increase. When less power is needed, the temperature, pressure and mass flow rate all can be lowered, maintaining the flow function FF around the design value of the first turbine 7 and increasing the pressure ratio across the second, high-pressure turbine 31 (or across the throttling valve).

Using a radial, high-pressure turbine as the second turbine 31 with variable NGVs 31A a good operability range with variable intermediate pressure (i.e. pressure at the outlet of the second turbine 31) can be achieved, while an axial, low-pressure turbine can be used as the first turbine 7 in combination with the combustor 21. The axial, low-pressure turbine 7 can be operated efficiently near the design flow function FF over a very wide load range.

Operation of the CAES system 1 of FIG. 3 is thus substantially similar to the operation of the CAES system 1 of FIG. 1, but with the additional option to use the intermediate pressure between the high-pressure turbine 31 and the low-pressure turbine 7 to modulate the total power output of the system, for instance.

Figure 4:
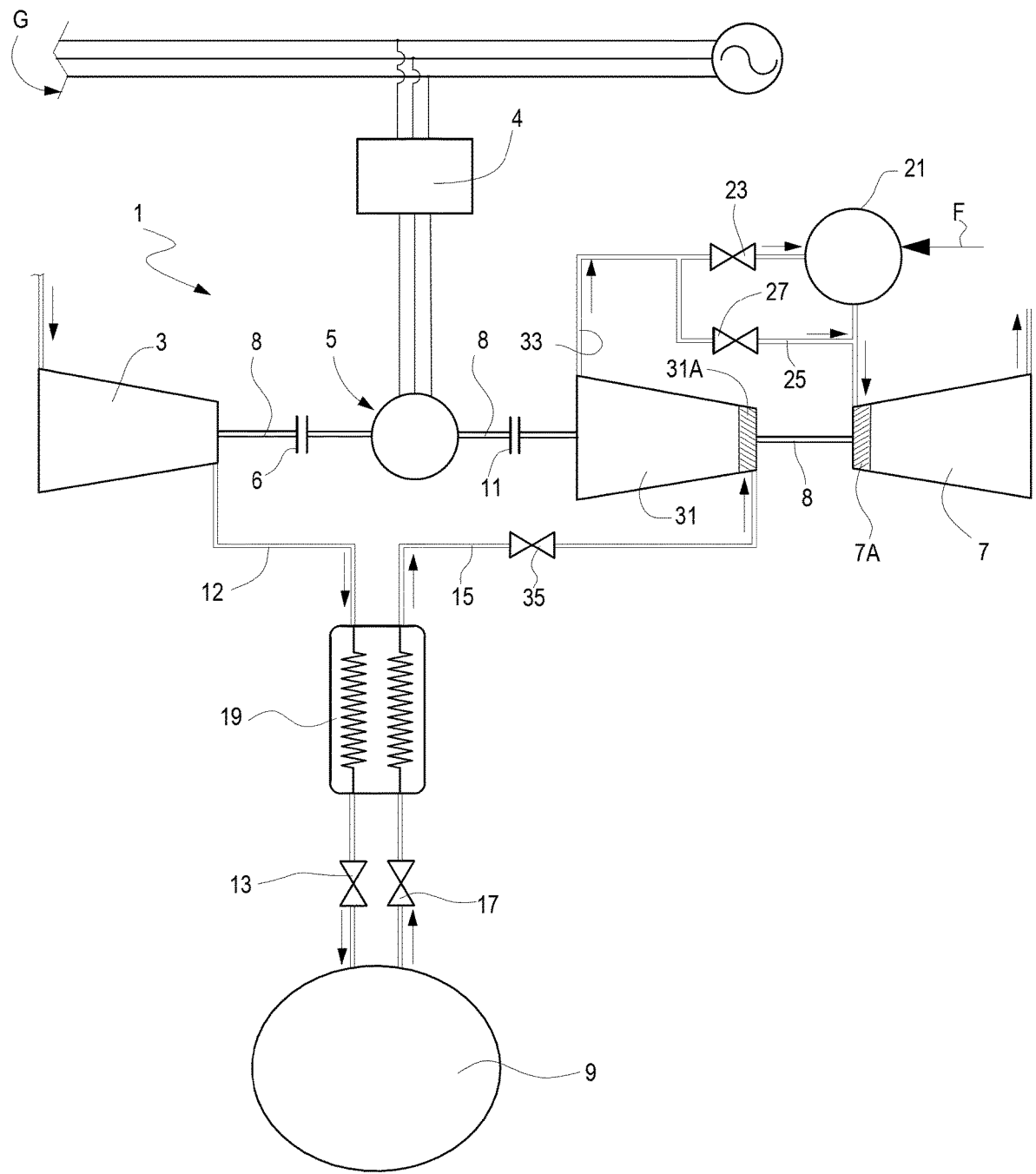
FIG. 4 illustrates a schematic of a CAES system according to an embodiment.

A yet further embodiment of a CAES system 1 according to the present disclosure is shown in FIG. 4. The CAES system 1 is substantially the same system of FIG. 3, except that the first turbine 7 and the second turbine 31 are arranged back-to-back, thus having opposite directions of expansion, such that the axial thrusts generated on the shaft 8 by the two turbines partly balance each other such that the total axial load on shaft 8 is reduced. Losses are reduced and less expensive axial bearings of smaller dimension and load capability can be used.

Figure 5:
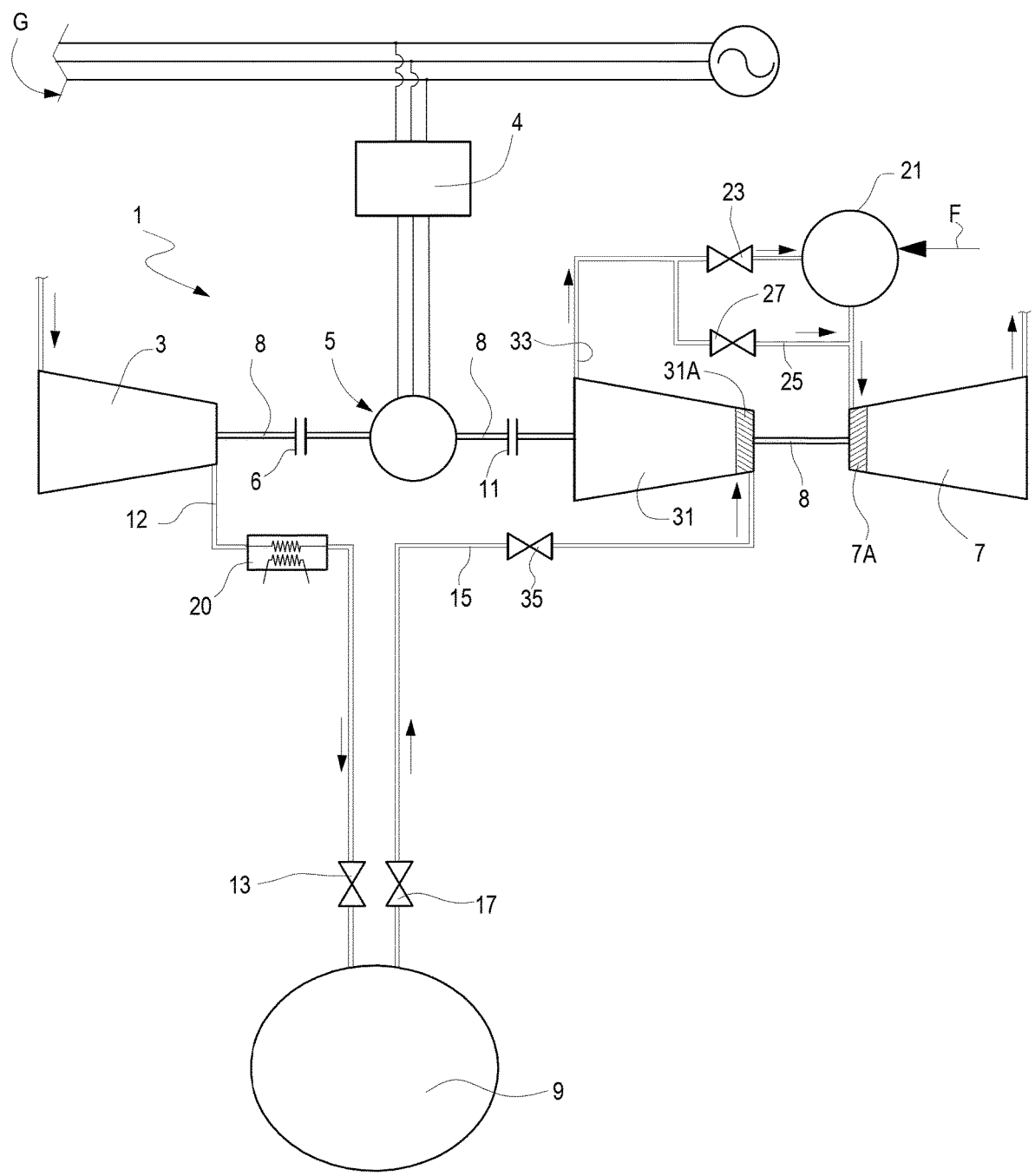
FIG. 5 illustrates a schematic of a CAES system according to an embodiment.

FIG. 5 illustrates a similar CAES system 1 as shown in FIG. 4, but wherein no thermal energy storage system 19 is provided. An air cooler 20 is used instead, to cool air between the delivery side of compressor 3 and the compressed air reservoir 9.

Similarly, also the CAES system 1 of FIG. 5 could be devoid of a thermal energy storage system and provided with an air cooler.

Figure 6:
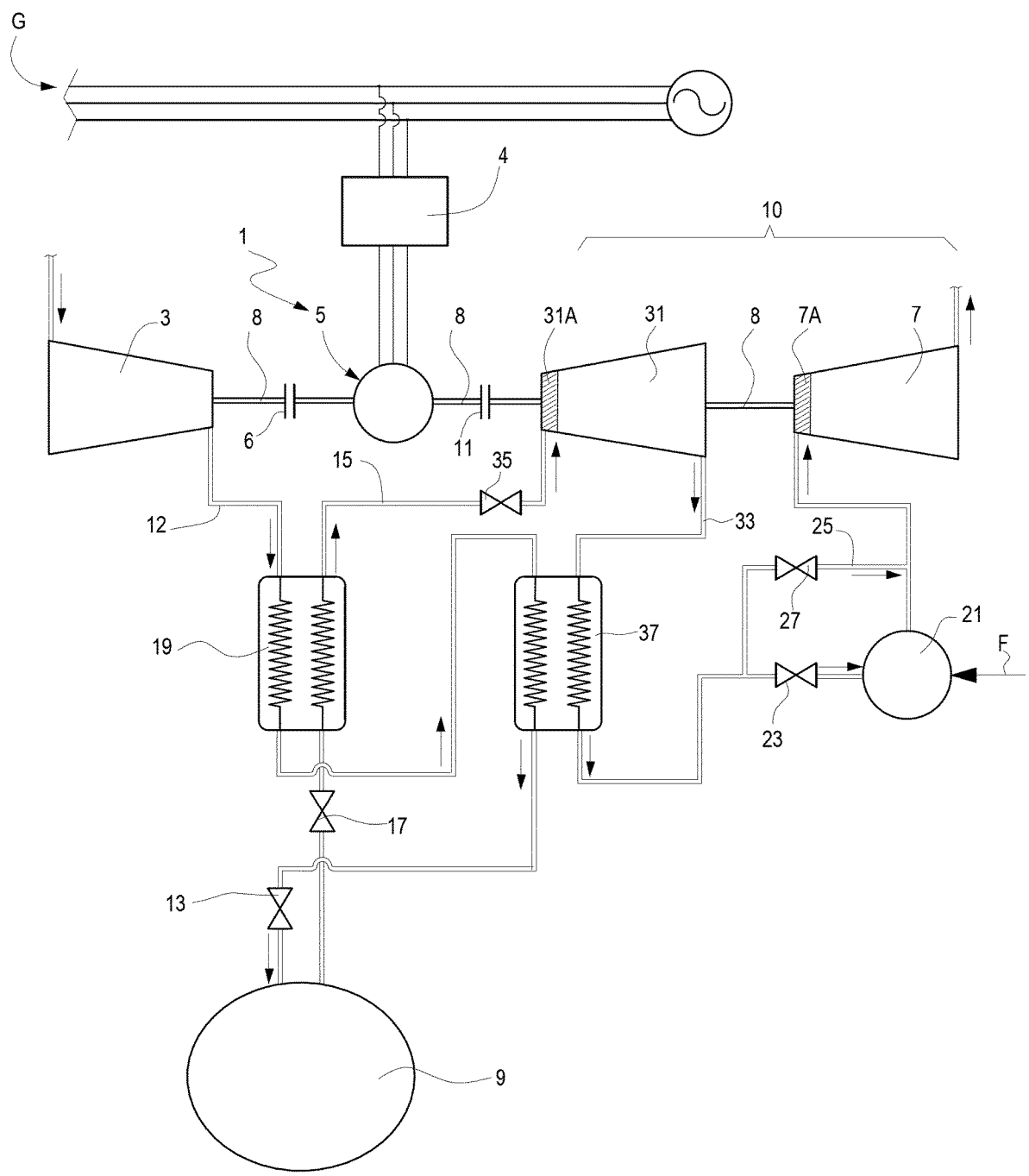
FIG. 6 illustrates a schematic of a CAES system according to an embodiment.

Several modifications and variations of the above described CAES systems 1 are possible. For instance, two separate thermal energy storage systems can be used, instead of one. FIG. 6 illustrates an exemplary embodiment of a CAES system 1 similar to the CAES system 1 of FIG. 3, wherein a second thermal energy storage system 37 is provided, arranged such that partly expanded air from the second, high-pressure turbine 31 is heated again, prior to being delivered to the combustor 21 and/or directly to the first, low-pressure turbine 7 through the by-pass line 25. The remaining elements, parts and components are identical to those of FIG. 3 and are labeled with the same reference numbers.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressed air energy storage system, comprising:
a compressor fluidly coupled to a compressed air reservoir and configured to deliver compressed air into the compressed air reservoir during an energy storing mode of the system;
an expansion train to expand the compressed air or combustion gas and produce mechanical power therewith during a power production mode of the system, the expansion train comprising at least a first turbine; an electric machine aggregate configured to convert electric power into mechanical power and drive the compressor therewith during the energy storing mode, and convert mechanical power produced by the expansion train into electric power during the power production mode;
a combustor configured to receive fuel and the compressed air, produce combustion gas and supply the combustion gas to the first turbine via a fluid line extending from the combustor to the first turbine;
at least one thermal energy storage system configured to remove heat from the compressed air delivered by the compressor to the compressed air reservoir and deliver heat through an outlet line to the compressed air flowing from the compressed air reservoir to the combustor and the expansion train;
a by-pass line arranged in parallel to the combustor and configured to direct a supply of the compressed air to the first turbine via the fluid line, by-passing the combustor, wherein the by-pass line includes a by-pass valve to control fluid flow therein, and is connected at one end to the by-pass valve and at an opposite end to the fluid line; and
an air flow control system configured to adjust the flow rate of the compressed air through the by-pass line and through the combustor, respectively,
wherein the air flow control system comprises the by-pass valve and a combustor valve upstream of the combustor, the by-pass valve and the combustor valve both fluidly connected to the outlet line.

2. The compressed air energy storage system of claim 1, wherein the first turbine comprises variable nozzle guide vanes.

3. The compressed air energy storage system of claim 1, wherein the expansion train further comprises a second turbine fluidly connected to the first turbine and arranged in series with the first turbine.

4. The compressed air energy storage system of claim 3, wherein the second turbine is arranged between the compressed air reservoir and the first turbine.

5. The compressed air energy storage system of claim 4, wherein the by-pass line and the combustor are arranged between the second turbine and the first turbine.

6. The compressed air energy storage system of claim 3, wherein the second turbine comprises variable nozzle guide vanes.

7. The compressed air energy storage system of claim 3, wherein the first turbine and the second turbine are arranged with opposing flow directions of expansion, such that axial thrusts generated on respective turbine rotors are balanced.

8. The compressed air energy storage system of claim 1, wherein the air flow control system is configured for offsetting a variation of a flow function of the first turbine as air pressure in the compressed air reservoir or a turbine power requirement changes.

9. The compressed air energy storage system of claim 8, wherein the flow function is defined as:

$$FF = \frac{m\sqrt{T}}{P}$$

wherein:
m is the mass flow through the first turbine
P is the inlet pressure of the first turbine
T is the inlet temperature of the first turbine.

10. The compressed air energy storage system of claim 1, wherein the air flow control system is configured for modifying at least one of a combustor exit temperature and an air flow through the by-pass line, to control an inlet temperature of the first turbine during operation of the system in the power production mode.

11. The compressed air energy storage system of claim 1, wherein the electric machine aggregate comprises a reversible electric machine configured and arranged to operate selectively: in an electric motor mode during the energy storing mode of the system, and in an electric generator mode during the power production mode of the system; and wherein the reversible electric machine is selectively mechanically coupled to the compressor and to the expansion train through a respective first clutch and second clutch.

12. A method of operating a compressed air energy storage system having a compressed air reservoir, an expansion train comprised of at least a first turbine configured for receiving compressed air from the compressed air reservoir, at least one thermal energy storage system, a combustor configured for receiving the compressed air and fuel and for delivering combustion gas to the first turbine, and a by-pass line in parallel to the combustor for delivering air to the first turbine; the method comprising the steps of:
removing heat from the compressed air delivered by the compressor to the compressed air reservoir via the at least one thermal energy storage system;
delivering heat from the at least one thermal energy storage system to the compressed air flowing from the compressed air reservoir through an outlet line to the combustor and the expansion train;
delivering the compressed air to the first turbine through the by-pass line via a fluid line that extends from the combustor to the inlet of the first turbine, expanding the compressed air in the first turbine and producing mechanical power therewith, wherein the by-pass line is connected at one end to a by-pass valve controlling fluid flow therein and at an opposite end to the fluid flow line;
increasing an energy content at an inlet of the first turbine by delivering the compressed air and fuel to the combustor via a combustor valve, producing combustion gas therewith and delivering the combustion gas or a mixture of combustion gas and the compressed air to the first turbine via the fluid line; and
controlling the amount of combustion gas to limit variations of a flow function at the inlet of the first turbine via at least the by-pass-valve and the combustor valve, the by-pass valve and the combustor valve both fluidly connected to the outlet line.

13. The method of claim 12, wherein the amount of combustion gas is controlled while air pressure in the compressed air reservoir or a turbine power requirement changes.

14. The method of claim 13, wherein the flow function is defined as $$FF = \frac{m\sqrt{T}}{P}$$

wherein:
m is the mass flow through the first turbine,
P is the inlet pressure of the first turbine, and
T is the inlet temperature of the first turbine.

15. The method of claim 12, further comprising the step of adjusting a pressure at the inlet of the first turbine.

16. The method of claim 15, wherein the pressure at the inlet of the first turbine is adjusted by modifying a pressure drop across a second turbine arranged between the compressed air reservoir and the first turbine, the by-pass line and the combustor being arranged between the second turbine and the first turbine.

17. The method of claim 16, wherein the pressure drop across the second turbine is adjusted by acting upon nozzle guide vanes of the second turbine.

18. The method of claim 12, further comprising the step of controlling an inlet temperature of the first turbine by adjusting a combustor outlet temperature, or by adjusting an air flow through the combustor, or both.

* * * * *